June 19, 1956  H. A. GOTTSCHALL  2,751,475
ELECTRIC TRANSDUCER
Filed Nov. 8, 1954  3 Sheets-Sheet 1
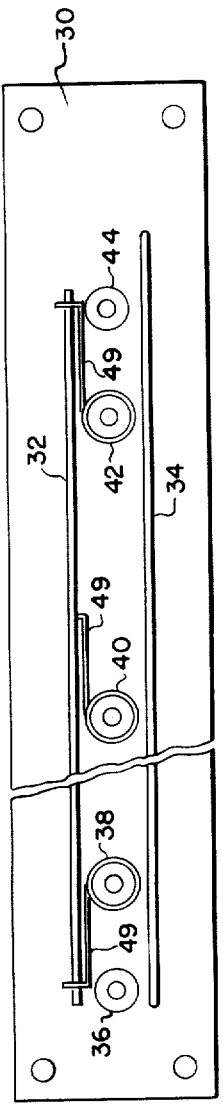
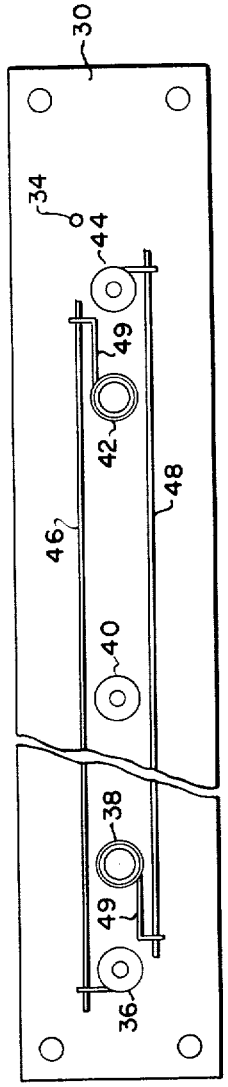
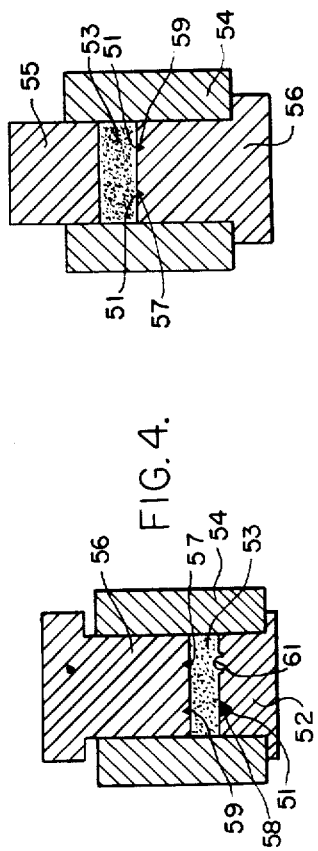
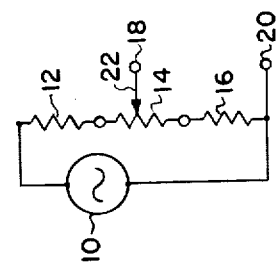
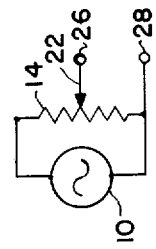
*INVENTOR.*
HERBERT A. GOTTSCHALL
BY
Leonard H. King
AGENT

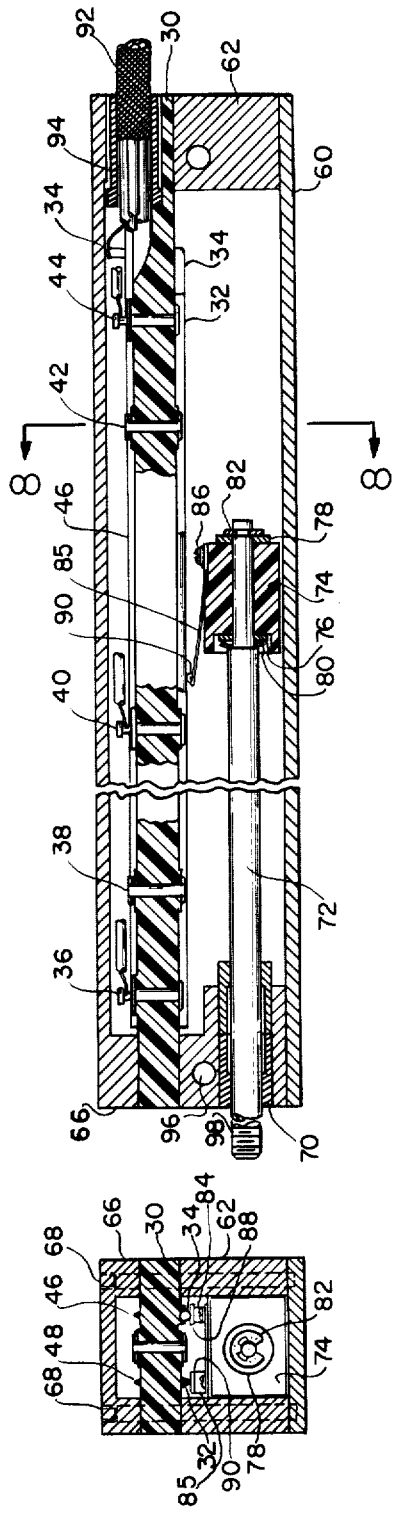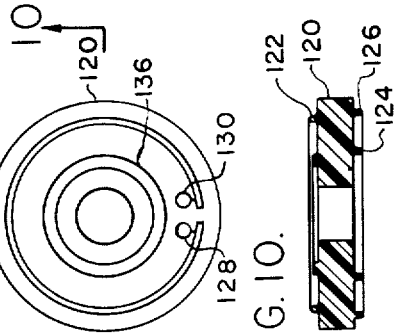

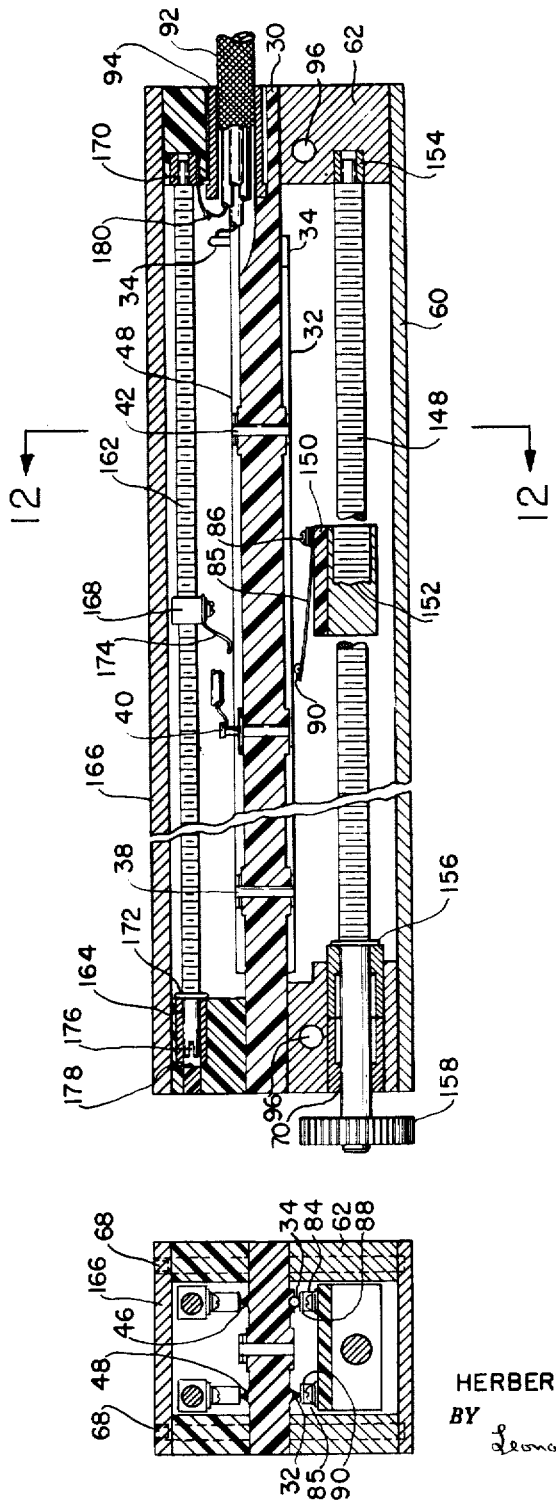

United States Patent Office 2,751,475
Patented June 19, 1956

2,751,475
ELECTRIC TRANSDUCER

Herbert A. Gottschall, Nutley, N. J., assignor to Myron A. Coler, Scarsdale, N. Y.

Application November 8, 1954, Serial No. 467,593

7 Claims. (Cl. 201—62)

This invention relates to transducers and in particular to potentiometer devices for translating a mechanical motion to a voltage.

In many complex electromechanical devices it is desirable that a common source of potential energize a number of cooperating units so as to save space and weight or to minimize phasing problems. Obviously the magnitude of the source must be sufficiently large to satisfy the maximum demand of the system. On the other hand some components may require a lesser voltage.

Another common requirement is that some of the cooperating units be provided with a variable voltage source. The input terminals of a potentiometer are connected so as to place a fixed resistance across the voltage source. A pair of output terminals make connection with a movable tap arranged to contact various points on the fixed resistance and one end of the fixed resistance. Such a potentiometer provides an output voltage which can be any fraction of the source of potential.

Frequently, it is of interest to provide a variable potential the maximum value of which is but a small fraction of the total applied source voltage. For non-exacting applications it is sometimes adequate to apply the total source potential to a potentiometer and to restrict the mechanical travel of the variable tap over only a small portion of the fixed resistance.

However, this solution is not satisfactory when a potentiometer is used as a transducer in applications demanding great accuracy, such as computers.

Frequently, a magnitude is introduced into a computer or telemetering system by translating a rectilinear or rotary shaft movement into a voltage by mechanically coupling the shaft to the variable tap of a potentiometer. A major factor in determining the accuracy of such a transducer is the length of the active resistance element as well as potentiometer resolution, effects of non-linearity over short spans and mechanical backlash. Therefore, it would not be desirable to restrict the mechanical travel of the variable tap.

A preferred approach is to limit the voltage applied to the potentiometer by providing padding resistors in series with the potentiometer so that only the desired total drop will exist across the potentiometer, and therefore the entire fixed resistance element of the potentiometer may be swept by the variable tap with resulting improved accuracy. If conventional resistors are connected in series with the potentiometer fresh problems are introduced. For example, the material for the resistors need be matched in temperature coefficient of resistance to that of the potentiometer element, otherwise serious errors will result due to temperature changes. Furthermore, even when such a match is obtained it is important to locate the resistors in the same temperature zone as the potentiometer element.

A noteworthy feature of this invention is that the various resistance elements are comolded to the same base which acts as a thermal sink so as to prevent rapid temperature fluctuations and maintain all elements at the same temperature.

It is an object of this invention to provide a transducer capable of high accuracy resolution over a limited portion of its resistance range.

It is another object of this invention to provide a transducer including a potentiometer resistance element and padding resistors maintained at the same temperature as the potentiometer resistance element.

An object of this invention is to provide an insulating plastic base having comolded thereto a potentiometer resistance element and padding resistors.

An object of this invention is to provide a transducer capable of accurately indicating an angular position in terms of an output voltage.

An object of this invention is to provide a transducer comprising a potentiometer provided with adjustable padding resistors.

These and other objects, features and aspects will be apparent from the following description of a practical embodiment illustrating the character of the invention; this description refers to the drawings in which:

Fig. 1a is a circuit diagram of a potentiometer of this invention connected to a source of voltage.

Fig. 1b is a circuit diagram of a conventional potentiometer connected to a source of voltage.

Figure 2 shows a bottom view of a resistance element of this invention.

Figure 3 is a top view of the member shown in Figure 2.

Figures 4 and 5 show cross-sectional views of molds employed in forming the member of Figure 2.

Figure 6 is an isometric drawing of a rectilinear potentiometer of this invention.

Figure 7 is a longitudinal section of the potentiometer of Figure 6.

Figure 8 is a cross-sectional view of the potentiometer of Figure 6, taken along plane 8—8.

Figure 9 is a plan view of a resistance element of this invention for use in a rotary potentiometer.

Figure 10 is a cross-sectional view taken along plane 10—10 of Figure 9.

Figure 11 is a longitudinal section of a transducer of this invention.

Figure 12 is a cross-section taken along plane 12—12 of Figure 11.

In Figure 1 there is shown a source of voltage 10 across which is connected a voltage divider network consisting of fixed resistor 12, potentiometer resistance element 14 and fixed resistor 16 in series. For purpose of illustration, let it be assumed that resistance elements 12, 14 and 16 are each 1,000 ohms. If the applied voltage from generator 10 is 30 volts, a total drop across each element would be 10 volts and the maximum variation possible across terminals 18 and 20 due to variation of movable arm 22 would be 10 volts. Thus with the maximum movement of wiper arm 22 the total voltage excursion would be from 10 to 20 volts. If a potentiometer 14 were connected as in Figure 1b the total variation across terminals 26 and 28 would be 30 volts. If it were desired to limit the voltage variation to the range of 10 to 20 volts as in Figure 1a then the total mechanical movement of movable arm 22 of potentiometer would of necessity be limited to one-third of the potentiometer resistance element surface. Therefore the accuracy of the potentiometer and the voltage steps representing resolution would be made larger. If the resistors 12 and 16 are formed of a material having a different temperature coefficient of resistance than that of potentiometer resistance element 14, then resistors 12, 14 and 16 will change differently with temperature and voltage errors will be introduced.

In order to eliminate this effect there is disclosed herein a transducer wherein the elements used for the padding resistors 12 and 16 are composed of the same material as the resistance element 14.

Referring now to Figure 2 there is shown the bottom face of insulating plastic base 30 to which there is co-molded resistance track 32 in the manner described hereinafter.

Also shown on the bottom face of base 30 is highly conductive collector track 34 which may be insert molded or may be attached to the base after molding.

The reverse side of plate 30 is shown in Figure 3 wherein terminals 36, 38, 40, 42 and 44 are shown extending through from the side containing resistance element 32. Padding resistors 46 and 48 are comolded to this face of element 30. Thus with respect to the terminals, between terminals 36 and 42 there is connected resistance 46, between terminal 42 and 38 there is connected resistance element 32, and between terminals 38 and 44 resistance 48, all three resistances being in series. One end of collector track 34, which may conveniently be made of 0.040" coin silver wire is shown protruding through from the opposite side of base 30.

Electrically conductive paths 49 are provided between terminals and the resistance elements. The paths may be clad with silver as for instance by application of silver lacquer (e. g. E. I. du Pont de Nemours & Co., Inc., Electrochemical Div. #2132).

Terminal 40 is connected to the midpoint of element 32 so as to provide a center tap which is frequently connected to ground.

The resistance elements are comolded with the base by the use of a mold of the type shown in cross-section in Figure 4. The mold is comprised of a mold base 52, mold collar 54 and mold force 56. A recess 58 is formed in base 52 corresponding to the resistance track 32 while force 56 is provided with a pair of recesses 57 and 59 corresponding to the padding resistors 46 and 48.

Mold force 55 is positioned with recesses 57 and 59 facing upwardly. The recesses 57 and 59 are then filled with conventional resistive molding compositions such as finely divided metal or carbon bonded by a synthetic resin, such composition preferably having a resistivity less than 100 ohm centimeters.

The collar 54 is positioned in place and the cavity filled with comminuted insulating plastic 53 perferably of the same base plastic as the conductive plastic. A simple piston 55, as shown in Figure 5 is used as a force to tamp the plastic particles in place sufficiently to permit inverting the mold without having the plastic particles fall out of the mold collar when piston 55 is removed. The piston 55 is removed. Recess 58 in base 52 is filled with a conductive plastic molding composition 51 as were recesses 57 and 59. Base 52 and the balance of the mold assembly are now reassembled without disturbing the molding powders. A protruding ridge 61 on base 52 provides a hollow recess in the molding to receive collecting track 34. Alternately the track may be insert molded. Heat and pressure conventional for the particular plastic is now applied. After cooling the mold is opened and the base and comolded conductive plastic resistance elements removed. Terminals 36, 38, 40, 42 and 44 may be insert-molded by standard techniques or inserted in holes either molded or later drilled.

A complete rectilinear transducer including resistance element is shown in Figure 6. The internal construction is shown in Figure 7 and 8 with reference to which the following description applies: Aluminum cover plate 60, aluminum case 62, plastic base 30 and aluminum cover lid 66 are secured together by screws 68. Padding resistors 46 and 48 are shown on top of the base 30 whereas resistance track 32 and collecting means 34 are located on the underside. An oil filled porous bronze bearing 70 supports shaft 72. Mounted on shaft 72 there is a phenolic brush holder 74 which is grasped between washers 76 and 78, bowed washer 80 and lock ring 82.

Beryllium cooper brushes 84 and 85 are mounted to brush block 74 by screws 86. Brush 84 traverses resistance element 32 and brush 85 which is electrically connected to brush 84 traverses collecting member 34. Collecting member 34 is at the potential of resistance element 32 at the point of contact of brush 84. Actual contact is made by precious metal cylindrical contact pieces 88 and 90.

Cable 92 is electrically connected to terminals 35, 40 and 44 and to the protruding end of collector 34. Brass cable bushing 94 is used to secure the cable 92.

Mounting holes 96 are provided for the mounting of the transducer.

Shaft 72 may be threaded as at 98 so as to provide a convenient coupling means.

The padding resistors 46 and 48 may be adjusted to an exact value of ohmic resistance by abrading off portions until the desired value is obtained.

The invention may also be applied to rotary potentiometers, an element for which is shown in Figures 9 and 10.

Insulating plastic base 120 has comolded thereto resistance element 122, padding resistors 124 and 126 and collecting member 136. Terminals 128, 130, extend through base member 120 and provide means to interconnect element 122 and resistors 124 and 126 in conformance with the circuit of Figure 1a.

The assembly shown may be employed in combination with conventional rotary potentiometer hardware such as brushes, shafts and the like.

In many applications it is desirable to translate rotary motion or angular position into a voltage. In Figure 11 there is shown a modification of the tranducer of this invention adapted to provide an output related to an angular position.

Lead screw 148 carries an insulator plastic brush block 150 mounted on internally threaded metal travelling nut 152. Nut 152 is restrained from rotating by its close fit with the sides of case 62. Lead screw 148 is inserted into bearing 154 which is press fit into housing 62. The lead screw 148 is locked into the housing by means of split ring 156. Gear 158, attached to the shaft may be used to couple the transducer to other equipment.

A particular advantage of this invention is emphasized by an alternate embodiment of this invention which incorporates a precise method of adjusting the padding resistor tracks 46 and 48. This feature is shown in Figure 11. The unit is assembled by inserting a lead screw 162 through bushing 164 of plastic housing 166. Housing 166 is provided with aluminum cover lid 167. Traveling nut 168 is then positioned on lead screw 162. Nut 168 is restrained from rotation by the wall of housing 166. Lead screw 162 is seated in metal bushing 170. The metal bushing is provided primarily for purposes of making electrical contact with lead screw 162. After lead screw 162 is positioned, split ring 172 is locked into a groove provided on the shaft so as to prevent axial movement of lead screw 162. Traveling nut 168 is provided with a beryllium copper spring 174 which serves to make contact with track 46. A similar assembly is provided to make contact with tract 48 as shown in Figure 12. In operation lead screw 162 is turned by means of a screw driver inserted into slot 176 until a desired resistance exists between contact 174 and the end of the resistance element connected to the active potentiometer element 32. When this adjustment has been made, a sealing material 178 such as optical pitch may be used to seal the lead screw adjustment for the purposes of preventing unauthorized adjustment. A terminal 180 which may be part of metal bushing 170 is provided for the purpose of making contact, in turn, through lead screw 162, traveling nut 168, and brush 174 to the track 46. Track 48 is similarly contacted.

In the specific arrangements described above, the potentiometer resistor element and the padding resistors are located on opposite sides of an insulator base. Be it noted that, space permitting, they may equally well be located on one side of the base.

Although the best mode presently contemplated for carrying out my invention includes comolded conductive plastic resistance elements, I wish it understood that conventional wire wound or coated types (such as metallized or deposited carbon types) of resistance elements may be substituted for the conductive plastic elements in noncritical applications. Likewise insulator base 30 may be of ceramic or other suitable insulator material.

While I have disclosed the best mode contemplated of carrying out the invention, be it understood that further modifications and changes may be made within the scope of the appended claims.

What is claimed is:

1. A transducer including, an insulating plastic base, a first conductive plastic resistance member adapted to be electrically contacted by a movable contact member and a pair of conductive plastic padding resistors comolded to said base, electrically conductive means interconnecting said padding resistors and said first resistance member, said first resistance member being interposed in series between said padding resistors, a movable arm, a movable contact member in contact with said first resistance member arranged to be positioned by the motion of said arm and means to electrically connect said movable contact member and said series resistances with an external circuit.

2. A transducer comprising in combination, a case member, an insulating plastic base supported by said case, a conductive plastic resistance member and a pair of conductive plastic padding resistors comolded to said base, said resistance member being electrically interposed between said padding resistors, a movable arm, a movable contact member in contact with said resistance member arranged to be positioned by the motion of said arm, an electrical collecting means, means for contacting said collecting means electrically connected to said movable contact member, terminal means connected to said collecting means, and terminal means connected to said padding resistors.

3. A transducer comprising in combination, a case member, an insulating plastic base supported by said case, a conductive plastic resistance member and a pair of conductive plastic padding resistors comolded to said base, said resistance member being electrically interposed between said padding resistors, a movable arm, a movable contact member in contact with said resistance member arranged to be positioned by the motion of said arm, an electrical collecting means, movable means for contacting said collecting means electrically connected to said movable contact member, terminal means electrically connected to the electrical midpoint of said resistance member, terminal means connected to said collecting means, and terminal means connected to said padding resistors.

4. A transducer comprising in combination, a case member, an insulating plastic base supported by said case, a conductive plastic resistance member extending above said base and comolded thereto, a pair of conductive plastic padding resistors comolded to said base, said resistance member being electrically interposed between said padding resistors, a movable arm, a movable contact member in contact with said first resistance member arranged to be positioned by the motion of said arm, an electrical collecting means, means for contacting said collecting means electrically connected to said movable contact member, terminal means connected to said collecting means, and terminal means connected to said padding resistors.

5. A transducer comprising in combination, a case member, an insulating plastic base supported by said case, a conductive plastic resistance member and a pair of conductive plastic padding resistors comolded to said base, said resistance member being electrically interposed between said padding resistors, a rotatable shaft arm, a movable contact member in contact with said resistance member arranged to be positioned by the rotation of said shaft, an electrical collecting means for contacting said collecting means electrically connected to said movable contact member, terminal means connected to said collecting means, and terminal means connected to said padding resistors.

6. A transducer comprising in combination, a case member, an insulating plastic base supported by said case, a conductive plastic resistance member and a pair of conductive plastic padding resistors comolded to said base, said resistance member being electrically interposed between said padding resistors, a rotatable shaft arm, a movable contact member in contact with said resistance member arranged to be positioned by the rotation of said shaft, an electrical collecting means for contacting said collecting means electrically connected to said movable contact member, terminal means connected to said collecting means, and adjustable terminal means connected to said padding resistors.

7. A transducer including, an insulating base, a first conductive plastic resistance member adapted to be electrically contacted by a movable contact member and a pair of conductive plastic padding resistors comolded to said base, electrically conductive means interconnecting said padding resistors and said first resistance member, said first resistance member being interposed in series between said padding resistors, a movable arm, a movable contact member in contact with said first resistance member arranged to be positioned by the motion of said arm, adjustable means to contact a selected portion of said padding resistors and means to electrically connect said movable contact member and said adjustable means with an external circuit.

References Cited in the file of this patent

UNITED STATES PATENTS

| 2,625,633 | Warsher | Jan. 13, 1953 |
| 2,668,218 | Searle | Feb. 2, 1954 |

FOREIGN PATENTS

| 50,441 | Denmark | July 15, 1935 |

UNITED STATES PATENT OFFICE
CERTIFICATE OF CORRECTION

Patent No. 2,751,475 June 19, 1956

Herbert A. Gottschall

It is hereby certified that error appears in the printed specification of the above numbered patent requiring correction and that the said Letters Patent should read as corrected below.

Column 6, lines 19 and 32, after "means", in each occurrence, insert -- , means --.

Signed and sealed this 7th day of July 1959.

(SEAL)

Attest:

KARL H. AXLINE
Attesting Officer

ROBERT C. WATSON
Commissioner of Patents